United States Patent [19]
Stanford

[11] 4,149,296
[45] Apr. 17, 1979

[54] FISH HOLDING, SCRAPING, AND CUTTING BLADE GLOVE

[75] Inventor: Franklin D. Stanford, Shaw, Miss.
[73] Assignee: Major E. Stanford, Downey, Calif.
[21] Appl. No.: 830,100
[22] Filed: Sep. 2, 1977
[51] Int. Cl.² .................................................. A22C 25/00
[52] U.S. Cl. ............................................. 17/66; 294/25; 2/161 R
[58] Field of Search .............. 17/66; 294/25; 2/161 R
[56] References Cited
U.S. PATENT DOCUMENTS

| 1,261,706 | 4/1918 | Condley et al. | 294/25 |
| 2,895,139 | 7/1959 | Compton | 17/66 X |

Primary Examiner—Willie G. Abercrombie
Attorney, Agent, or Firm—Gust, Irish, Jeffers & Rickert

[57] ABSTRACT

A glove having four elongated finger portions and an elongated thumb portion extending from a glove palm of a roughened material impervious to fish cleaning products, is provided with a molded-in finger sleeve for each finger portion having transverse corrugations for gripping a fish body. The end of each finger portion is provided with a plurality of arcuately shaped scraping edges affixed thereto spaced in radially projecting planes about the end of said finger portions. A longitudinal slot is formed in the thumb portion for receiving a hardened blade projecting from an arcuate thumb conforming base which is insertable from the inside of the thumb portion through the slot.

5 Claims, 5 Drawing Figures

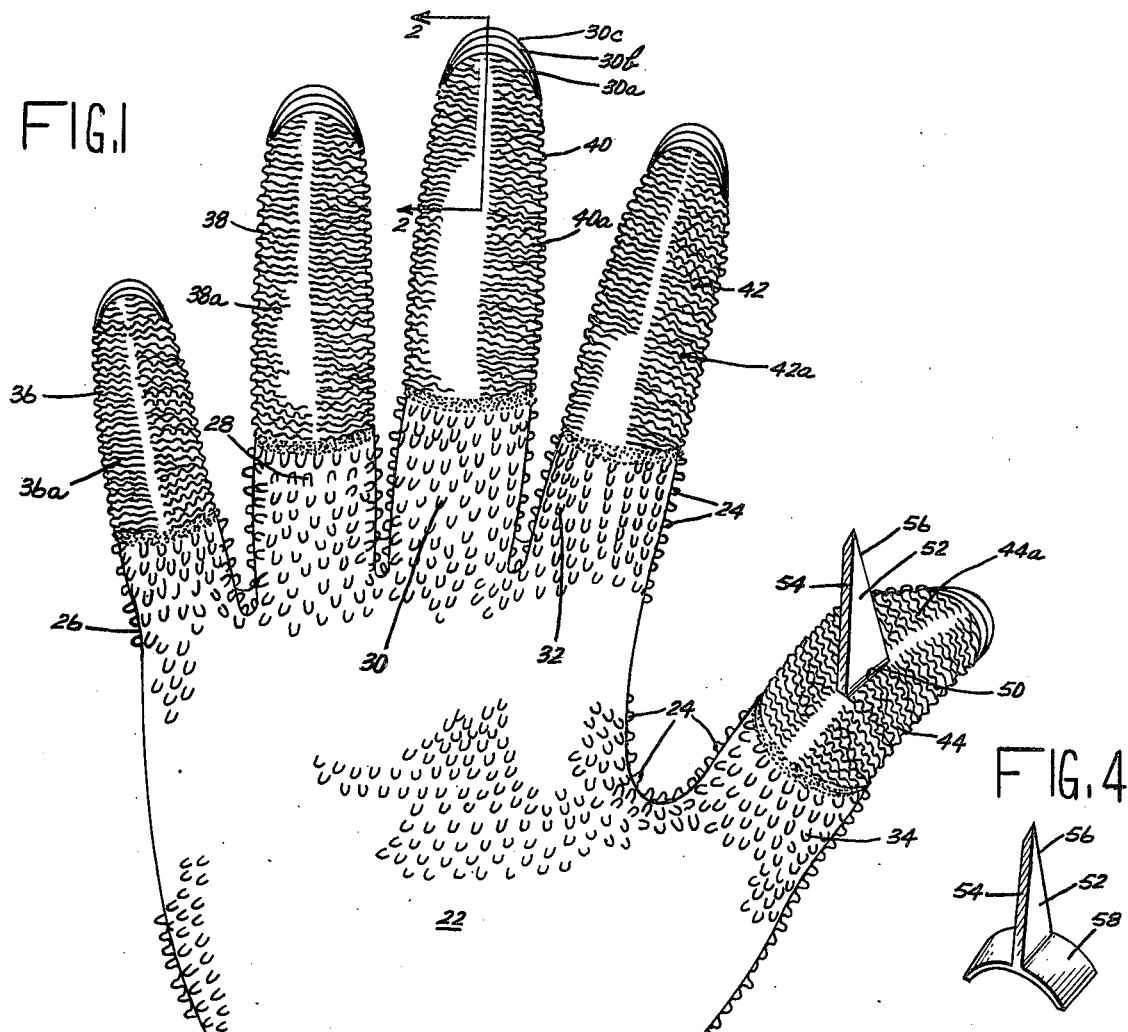
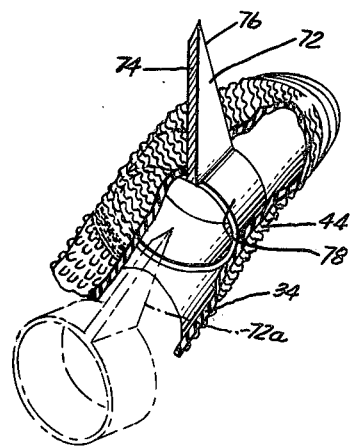
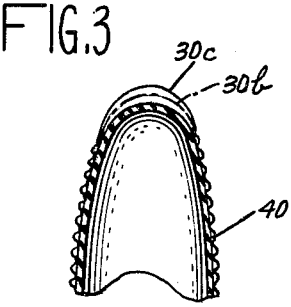
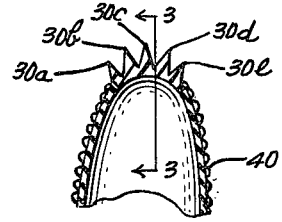

FISH HOLDING, SCRAPING, AND CUTTING BLADE GLOVE

BACKGROUND OF THE INVENTION

1. Field of the Invention

This invention is in the field of fish cleaning, scaling, and gutting devices, and more particularly to a glove which is adapted for wearing on each hand of the user to accomplish these functions.

2. Description of the Prior Art

Numerous devices have been provided in the art for assisting in the preparation of a fish for human consumption. Among these devices have been numerous gloves with various surfaces and attachments for easily and facilely performing the necessary cleaning, scaling, and gutting operations. However, the location, configuration, positioning, and design of the glove surfaces and implements have not been entirely satisfactory for performing the above operation, even though numerous attempts have been made for accomplishing these purposes.

SUMMARY OF THE INVENTION

A glove having four elongated finger portions and an elongated thumb portion extending from a palm is made of a material which has a roughened texture and is impervious to the fish cleaning by-products such as fish entrails, fish scales, and the like. Each of the finger portions is provided with a molded-in finger sleeve having transverse corrugations for gripping a fish body. The sleeves may be made of a heavy corrugated relatively inflexible plastic material which are positioned intermediately of the finger portions and are adapted to securely grip the fish body upon finger pressure thereto. Each of the finger and thumb portion ends is provided with a plurality of arcuately shaped scraping edges, which may be made of a hard plastic material, affixed to the finger and thumb ends and spaced in radially projecting planes about the finger and thumb ends. Thusly configured, each finger end and thumb end of the glove may be used to efficiently scrape scales from the fish side. Gloves are provided for each hand so that while the sleeve portions of one hand are holding the fish, the arcuate edge portions of the other hand may be used for scraping the fish.

A longitudinal slot is provided in the elongated thumb portion and receives a hardened knife edge blade which extends from an arcuately shaped base positioned inside the thumb portion and adapted to conform to the thumb configuration. The blade projects outwardly from the base through the slot in a cutting position. The thumb portions of each glove maybe provided with a slot so that the cutting maybe performed by either hand. The blades are easily removable from the glove so that they will not be in interfering relation during the cleaning and scraping of the fish.

Each glove has an adjustable wrist portion which is fastenable to hold the glove securely on the user's hands and may be adjusted to a plurality of wrist diameters.

Therefore it is an object of this invention to provide an improved fish cleaning, scraping, and gutting glove wherein improved configurations for fish holding, fish scraping, and a removable fish gutting blade are provided.

It is a further object of this invention to provide in the glove of the foregoing object scraping members at the end of each finger portion in the glove to advantageously provide for scraping and cleaning with the finger tips on the gloves.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevational view of a preferred embodiment of this invention;

FIG. 2 is a section taken at 2—2 of FIG. 1;

FIG. 3 is a section taken at 3—3 of FIG. 2;

FIG. 4 is a perspective view of a removable gutting blade; and

FIG. 5 is a partial view in perspective of a thumb portion of the glove of FIG. 1 broken away showing a second embodiment of a gutting knife in the inserted position and shown in dashed lines in the removed position.

DESCRIPTION OF PREFERRED EMBODIMENTS

Referring to the drawing, glove 20 has palm 22 made of a material impervious to fish cleaning matter, such as fish entrails, fish scales, and the like, and has a roughened surface with a plurality of small projections 24 formed thereon, such as would be provided by using a rug rubber material. Extending from palm 22 are elongated finger portions 26, 28, 30, and 32, and elongated thumb portion 34. Each of portions 26 to 34 have elongate molded in sleeves 36, 38, 40, 42, and 44 respectively of a material which is somewhat inflexible and has transverse corrugations 36a, 38a, 40a, 42a, and 44a along the respective lengths thereof. Finger portion 30 has a plurality of arcuate fish scaling and scraping edges 30a, 30b, 30c, 30d, and 30e affixed to the end of finger portion 30 and are divergent from one another being in substantially radially projecting planes from the finger portion 30 end. Each finger portion 26 to 32 and thumb portion 34 have similar arcuate edges formed at the ends thereof. Referring to FIG. 2, these edges are triangular in cross-section and may be formed of a hard plastic insert molded in to the respective finger ends. Due to their arcuate configuration and divergent radially projecting planes, a three dimensional multi-edge scraping and cleaning implement is provided at each finger and thumb end so that cleaning may be facilely and quickly accomplished along the fish body and body crevices.

A longitudinal slot 50 is formed in thumb portion 34 and receives triangularly shaped metallic blade 52 having cutting edges 54, 56, formed thereon. Blade 52 projects from an arcuate base 58 configured to conform to the user's thumb surface. After the fish has been cleaned and scraped, which is typically done with blade 52 removed from glove 20, blade 52 maybe inserted through slot 50 and held against the user's thumb by thumb base portion 34 for gutting the fish. Two-way cutting action is provided by edges 54 and 56 and after the fish has been completely cleaned, blade 52 maybe removed form glove 20.

To hold glove 20 on the user's hand, an adjustable wrist strap 60 having several spaced columns of male fastener elements 62 formed at one end thereof and one column 64 of female fasteners which register with fasteners 62 and maybe removably engaged with a preselected column 62 after glove 20 has been fitted on the user's hand to comfortably yet snugly cause band 60 to engage the user's wrist. Band 60 is affixed to the lower portion of glove 20.

Referring to FIG. 5, an alternate embodiment of a cutting blade 72 having cutting edges 74, 76 is shown. Blade 72 is affixed to a ring 78 which is adapted to be fitted completely around the user's thumb for additional blade support in the cutting action. As in the previous embodiment, blade 72 is removable, and shown in removable position by dashed lines 72a, and also as in the previous embodiment would ordinarily be removed during the scaling operation and inserted for the gutting operation.

The glove shown in the drawings is for the user's right hand but typically the user would have a similar glove on his left hand and since each glove is provided with gripping sleeves on the finger portions, arcuate scraping edges at the finger portion ends, and a removable cutting blade, holding, scraping, and cleaning maybe done equally well with right handed or left handed operation.

While there have been described above the principles of this invention in connection with specific apparatus, it is to be clearly understood that this description is made only by way of example and not as a limitation to the scope of the invention.

What is claimed is:

1. A fish scaling and cutting glove comprising a glove having five elongated digit portions comprising four elongated finger portions and an elongated thumb portion extending from a palm;
   at least one of said digit portions having a molded-in digit sleeve having transverse corrugations for gripping a fish body;
   one end of at least one digit portion having a plurality of arcuately shaped non-resilient scraping edges affixed thereto spaced in radially projecting planes about the end of said one digit portion.

2. The apparatus of claim 1 including a longitudinal slot in one of said digit portions;
   a hardened blade projecting from an arcuate digit conforming base being removably insertable from the inside of said digit portion through said slot and extendible from the exterior of said digit portion in fish cutting position.

3. The apparatus of claim 2 wherein said arcuate base is a circular ring in conformation and fittable about the user's digit.

4. The apparatus of claim 1 wherein each digit portion has a molded-in sleeve having transverse corrugations and each end of each digit portion having a plurality of arcuately shaped non-resilient scraping edges affixed thereto spaced in radially projecting planes about the end of said each portion.

5. The apparatus of claim 1 including adjustable wrist engaging band affixed to the glove palm opposite said finger portions to snugly and comfortably engage the user's wrist.

* * * * *

UNITED STATES PATENT AND TRADEMARK OFFICE
CERTIFICATE OF CORRECTION

PATENT NO. : 4,149,296

DATED : April 17, 1979

INVENTOR(S) : Franklin D. Stanford

It is certified that error appears in the above-identified patent and that said Letters Patent are hereby corrected as shown below:

Col. 2, line 62, change "form" to --from--.

Claim 1, Col. 4, line 9, after "one" insert --last mentioned--.

Signed and Sealed this

Thirty-first Day of July 1979

[SEAL]

Attest:

LUTRELLE F. PARKER

Attesting Officer     Acting Commissioner of Patents and Trademarks